United States Patent [19]
Frembgen

[11] Patent Number: 5,865,977
[45] Date of Patent: Feb. 2, 1999

[54] PROCESS FOR THE ELECTROCHEMICAL TREATMENT OF FLOW CHANNELS IN METAL WORKPIECES

[76] Inventor: Fritz-Herbert Frembgen, Erfurter Strasse 31, D-87700 Memmingen, Germany

[21] Appl. No.: 817,692
[22] PCT Filed: Oct. 12, 1995
[86] PCT No.: PCT/EP95/04020
 § 371 Date: Jun. 30, 1997
 § 102(e) Date: Jun. 30, 1997
[87] PCT Pub. No.: WO96/12586
 PCT Pub. Date: May 2, 1996
[30] Foreign Application Priority Data
 Oct. 21, 1994 [DE] Germany .......................... 44 37 624.3
[51] Int. Cl.$^6$ .................................................. B23H 3/00
[52] U.S. Cl. .......................... 205/118; 205/128; 205/131; 205/150; 205/641; 216/84
[58] Field of Search ..................................... 205/118, 128, 205/131, 150, 641; 216/84

[56] References Cited

U.S. PATENT DOCUMENTS 4,995,949 2/1991 Rhoades ................................. 205/118

*Primary Examiner*—Arun S. Phasge
*Attorney, Agent, or Firm*—Notaro & Michalos P.C.

[57] ABSTRACT

A process for electrochemical treating flow channels of metal workpieces uses a tool extending into the workpieces and an electrolyte flow between the tool and the flow channel. Either volume flow of the electrolyte, or pressure of the electrolyte, or both, are measured in a reference sample workpiece calibrated previously with test oil under high pressure and the determined electrolyte value is stored as a nominal value and used for a subsequent series treatment of the workpieces. This value is used as a regulating variable for termination of the treatment. The pressure of the electrolyte during the electrochemical series treatment of the workpieces is maintained at about 100 bars.

8 Claims, 5 Drawing Sheets

PROCESS FOR THE ELECTROCHEMICAL TREATMENT OF FLOW CHANNELS IN METAL WORKPIECES

This application is a 371 of PCT/EP95/04020 filed Oct. 12, 1995.

FIELD AND BACKGROUND OF THE INVENTION

The invention relates to a method for the electrochemical treatment of metal workpieces, in particular of their flow channels, by means of a tool inserted into the flow channel and an electrolyte flow between the tool and the wall of the flow channel.

Such method is known from DE 40 40 590 C1. Subject matter of the known method is the continuous measurement of the electrical voltage at the working gap between tool and workpiece, wherein with increasing gap width due to the erosion of the material, the operating current is increased in order to reduce the work time. In such method it has already been suggested to make the end of the working process dependent on attaining a nominal final voltage at the working gap. Since according the known method, the operating current during the treatment procedure is to be raised continuously, for the regulation of the current increase a physical variable has been suggested which varies with increasing size of the working gap. In the simplest case, as the physical variable the gap voltage is addressed there. Alternatives are the throughflow volume and the pressure of the electrolyte.

When deburring workpieces which comprise narrow flow channels, in particular nozzle bodies with intersecting bores, the suitable length of time of treatment for the removal of the burrs is determined in several test runs. But no calibration can be achieved with this method.

The result is that in spite of constant electrochemical treatment, tolerances on the order of magnitude of 8% of the nominal throughflow, are present. Each individual nozzle must subsequently be calibrated with test oil under high pressure wherein the actual oil throughflow is measured. Depending on the measured values, the nozzle bodies are subsequently divided into different tolerance groups.

SUMMARY OF THE INVENTION

It is the task of the invention to perform the calibration of such workpieces comprising flow channels already during the electrochemical rounding-off of workpiece edges so that the electrochemically treated workpieces have the same throughflow values and the subsequent calibration with test oil can thus be omitted.

This task is solved according to the invention in that a workpiece is treated electrochemically in a test run and at least one physical electrolyte value, including the volume flow of the electrolyte and its pressure, is measured and placed into intermediate storage. The workpiece is calibrated with test oil under high pressure in that the actual throughflow is determined and compared with the nominal throughflow. In the event of deviation, further test runs are carried out with longer treatment time and/or higher operating current until, at the calibration, the actual throughflow agrees with the nominal throughflow, and the electrolyte value determined from the last test run is stored as the nominal value and is used for the subsequent series treatment of the workpieces as control variable for the termination of the treatments.

The task according to the invention could not be solved with the known methods because it was found that the gap voltage at the working gap does not have a fixed relation to the through flow resistance in the flow channel. However, it was surprisingly found that the value of the electrolyte throughflow allows for a reproducible determination for the subsequent calibration with test oil under high pressure to be made. It is furthermore surprising that the gas formation of the electrolyte in the working gap does not generate inaccuracies of any significance so that here also no random dependence develops.

The essential inventive concept thus comprises the calibration of the workpieces, in particular nozzle bodies, in combination with the electrochemical treatment. Due to the detected interdependence of test oil throughflow and electrolyte throughflow, with the method according to the invention, precise throughflow values of the nozzle bodies can be ensured after the electrochemical treatment. Experiments have shown that when subsequently remeasured the nozzle bodies have shown tolerance deviations in the calibration measure of less than or equal to ±1 percent.

The best results were obtained if the pressure of the electrolyte could be kept constant within narrow limits before its passage through a volume measuring device, and, with an increase of this electrolyte pressure, the accuracy was further increased. An advantageous embodiment of the invention therefore comprises shifting the electrolyte pressure into that order of magnitude which obtains for the pressure of the test oil during the calibration or the remeasuring. In the case of a nozzle body for an injection pump this pressure is the operating pressure of the injection pump which is on the order of magnitude of 100 bars.

According to a further embodiment of the invention the volume flow of the electrolyte is measured continuously, thus also during the treatment time. This measurement includes also the digital measurement with rapidly successive measuring steps. An alternative solution within the scope of the invention comprises the treatment times and the measuring times alternating so that the volume flow, or the pressure of the electrolyte, is only measured during the switch-off periods of the electrochemical treatment procedure. Since in this variant the gas bubble formation in the working gap is eliminated, the throughflow calibration can be ensured within even narrower limits.

For the majority of applications it is sufficient according to a further development of the invention if at least during the final phase of the treatment the measurement of the volume flow takes place after the operating current is switched off.

It is thus essential for the invention that the nominal throughflow and/or the pressure of the electrolyte for the electrochemical treatment is determined by a sample nozzle or calibration nozzle which meets the nominal throughflow conditions with test oil. This can not only be attained empirically in several successive test runs with individual nozzles but rather, for example, also with a test run of a nozzle blank and subsequent mathematical extrapolation. Equally conceivable is also the use of a sample nozzle which meets the calibration conditions and with which subsequently the electrolyte value of the associated volume flow and/or pressure is determined. However, it must herein be ensured that the sample nozzle differs only from the nozzle blank to be treated by the burr removed electrochemically.

BRIEF DESCRIPTION OF THE DRAWINGS

The invention will be explained in further detail by example with reference to the drawing. Which depict.

DESCRIPTION OF THE PREFERRED EMBODIMENTS

Figure 1:
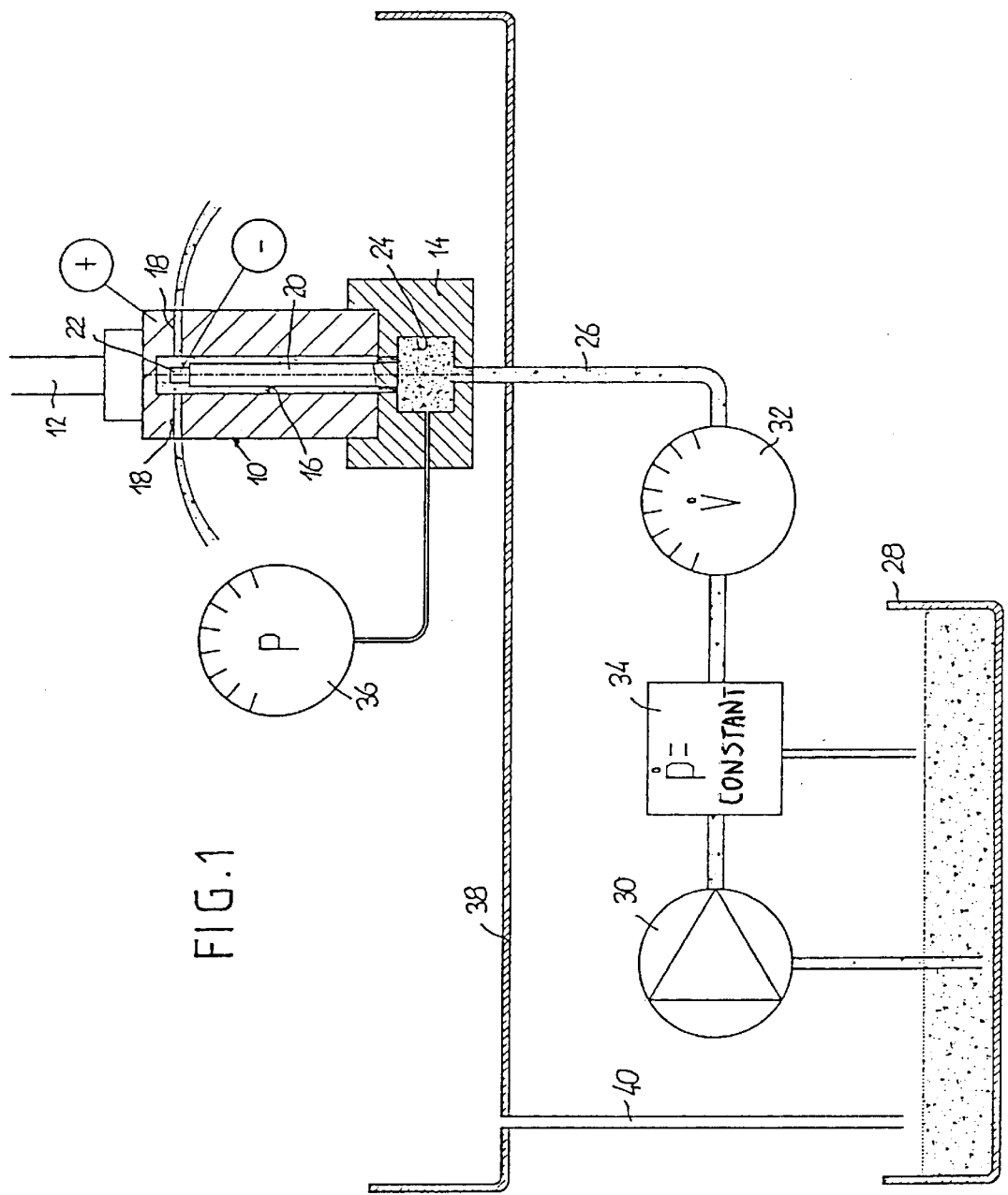
FIG. 1 a schematic view of the electrolyte circulation in an electrochemical treatment installation, FIG. 2 a first variant of the installation according to FIG. 1, FIG. 3 a further variant of installation 1.

A workpiece 10 is pressed onto a tool 14 by means of a pneumatic cylinder 12. The workpiece 10 represents a nozzle body which comprises a coaxial pocket bore 16 and thin transverse bores 18 terminating in it. The tool 14 carries a pin 20 which projects with radial spacing into the pocket bore 16 of the workpiece 10, and carries an anode 22 at the upper end at the height of the transverse bores 18. The tool 14 comprises a chamber 24 in which terminates an electrolyte line 26 to which electrolyte is supplied from a supply basin 28. The supply takes place via a pump 30 and a volume throughflow meter 32, wherein between the pump 30 and the throughflow meter 32 a pressure reducer valve 34 is disposed which ensures the constant pressure of the electrolyte when entering the throughflow meter 32. The pressure of the electrolyte in the tool chamber 24 is measured by means of a manometer 36.

During the treatment procedure the electrolyte flows from the chamber 24 into the annular space between pocket bore 16 and pin 20 in the upward direction into the region between the anode 22 and the bore edges of the transverse bores 18, and leaves the workpiece 10 through these transverse bores 18. It is collected in a collection basin 38 and is conducted via a return line 40 into a (not shown) filter installation and from there back into the supply basin 28.

In the embodiment the workpiece 10 represents a nozzle body in an injection nozzle, for example for Diesel engines. Based on the effort to save fuel, the demand existed that these nozzles maintain at 100 bars a nominal throughflow within a tolerance range of ±1% and specifically in measurements with jet test oil conventional for jet tests. After the mechanical treatment the nozzle body blanks have unavoidable burrs at the inner termination sites of the transverse bores 18, which burrs must be removed electrochemically so that the termination edges are rounded off in the finished nozzle body.

According to the invention the procedure is followed that the pump 30 is switched on in order to start the electrolyte circulation. As soon as the predetermined pressure is reached at the manometer 36, the operating voltage is applied so that an operating current flows between the anode 22 and the termination edges of the transverse channels 18 of the workpiece 10 serving as cathode. After a treatment time which can be between 1 and 3 seconds depending on the burr formation, at the end of the treatment time the volume flow at the throughflow measuring device 32 is measured and electronically placed into intermediate storage. The nozzle body 10 is then removed from the treatment arrangement and placed into a (not shown) test device. In the latter the pocket bore 16 is connected to a test oil pressure source. This pressure source is for example at a pressure of 100 bars. The quantity of the test oil penetrating from the transverse bores 18 per unit time is measured. As a rule, the actual throughflow value is below the nominal value. The difference is a measure for the extension of the work time and/or the magnitude of the operating current for the next test run carried out with a new workpiece blank. The throughflow meter 32 measures at the end of the treatment procedure a higher throughflow value than in the first test run. This second throughflow value is also placed into intermediate storage whereupon the workpiece is removed from the treatment arrangement and subjected to a new calibration measurement. With some experience two or three test runs are sufficient to obtain in the calibration an actual value which at least approximates the nominal value. For the subsequent series treatment of the workpieces the intermediately-stored throughflow value of the throughflow meter 32 in the last test run, after at most slight correction corresponding to the difference between actual and nominal value during the calibration, is set as the regulating variable. The series treatment subsequently no longer takes place under time-dependent control but rather the actual value of the electrolyte throughflow in the throughflow meter 32 is compared with the set nominal value and, in the event both values agree, the electrochemical treatment procedure is terminated.

Experience with the new method has confirmed that in the series treatment a final agreement with the test oil calibrations in the narrow tolerance range of approximately 1% at nominal level is attained.

Figure 2:
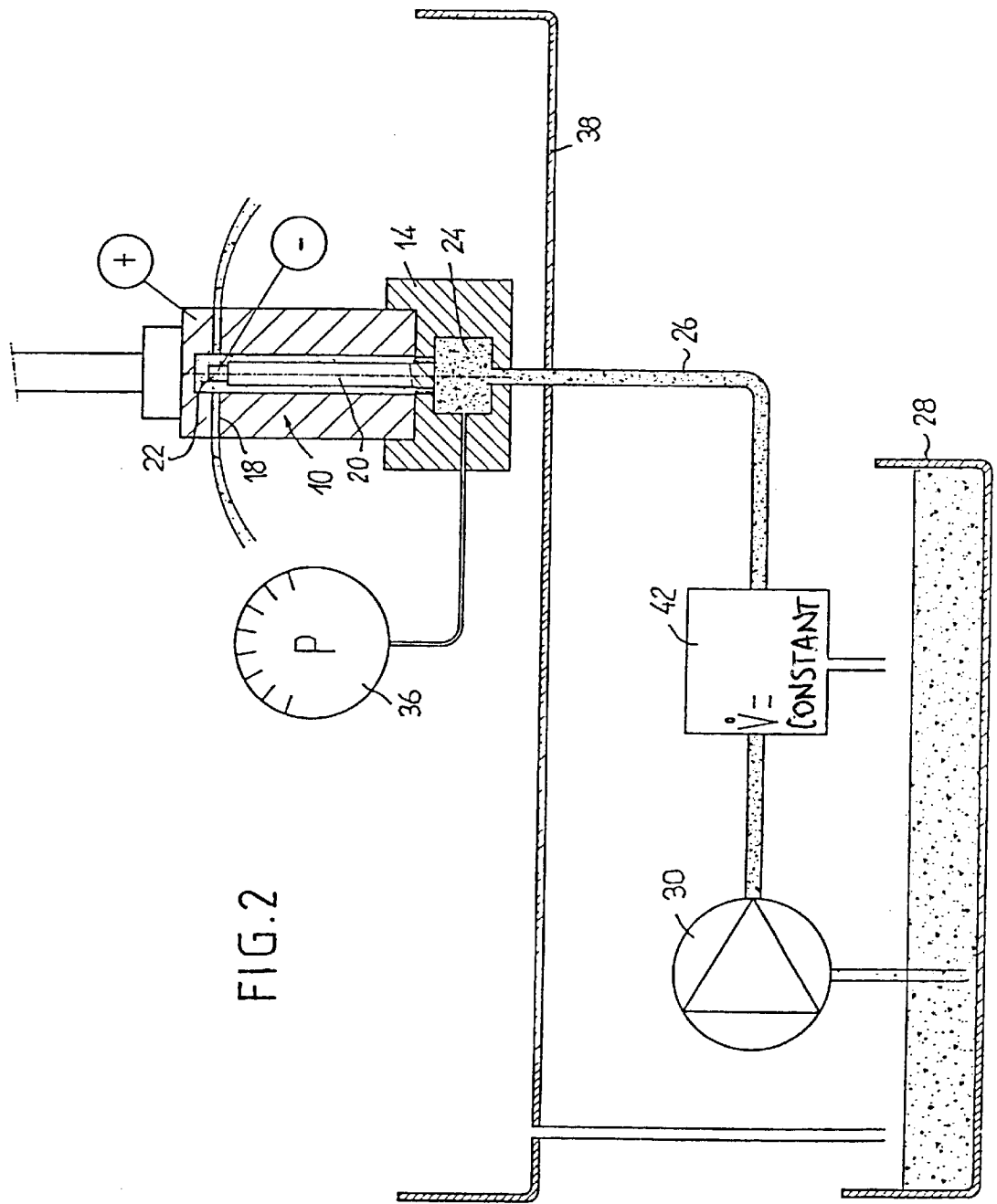

Instead of a constant supply pressure of the electrolyte, the variant according to FIG. 2 operates with a throughflow regulator 42 which regulates the electrolyte flow to constant throughput. During the electrochemical treatment the burrs at the terminations of the transverse bores are removed and rounded off. In the process the flow resistance decreases. The pressure displayed at the manometer 36 decreases accordingly. The pressure at the end of the first test run is again intermediately stored whereupon the workpiece is subjected again to calibration measurement. Here too, as a rule, some test runs are required in order to achieve calibration at the desired nominal value. The pressure of the electrolyte in the chamber 24 corresponding to this nominal value is recorded by the manometer 36 and intermediately stored and subsequently serves as the regulating variable for the subsequent series fabrication.

Figure 3:
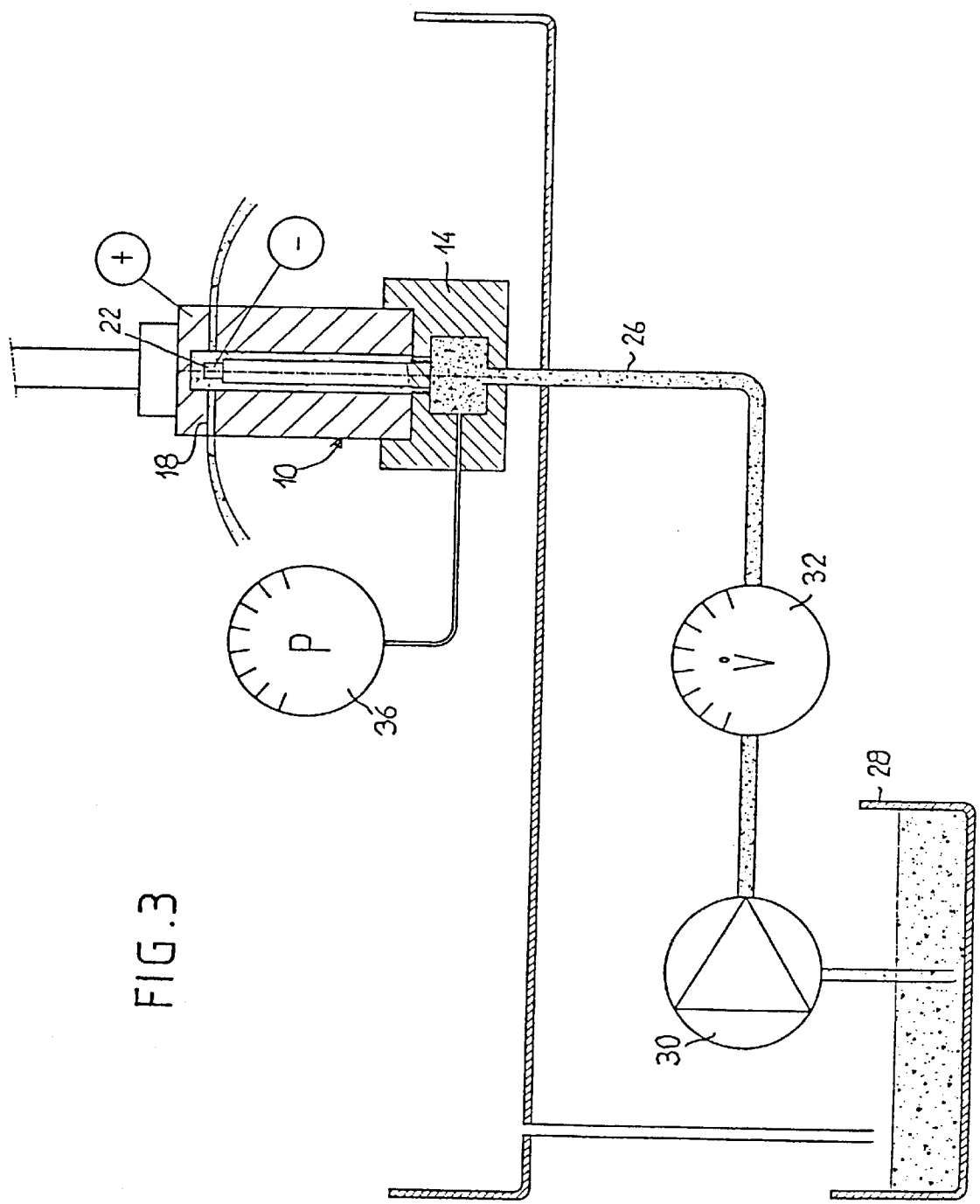

FIG. 3 illustrates a variant in so far as the method can also be implemented without keeping constant either the pressure or the volume of the electrolyte. However, the pump 30 must not have a constant characteristic so that at the same flow conditions in workpiece 10 the throughflow and the pressure can become regulated to the same values. In this variant, the throughflow must be determined with the throughflow measuring device 32 and the pressure with the manometer 38 and used parallel as inputs into a computer which establishes a relation via the programmed-in characteristic of the pump 30 and switches off the series treatment procedure if the measured values of the throughflow 32 and of the manometer 36 yield a value put established via the pump characteristic, which agrees with the value determined in the last test run.

Figure 4:
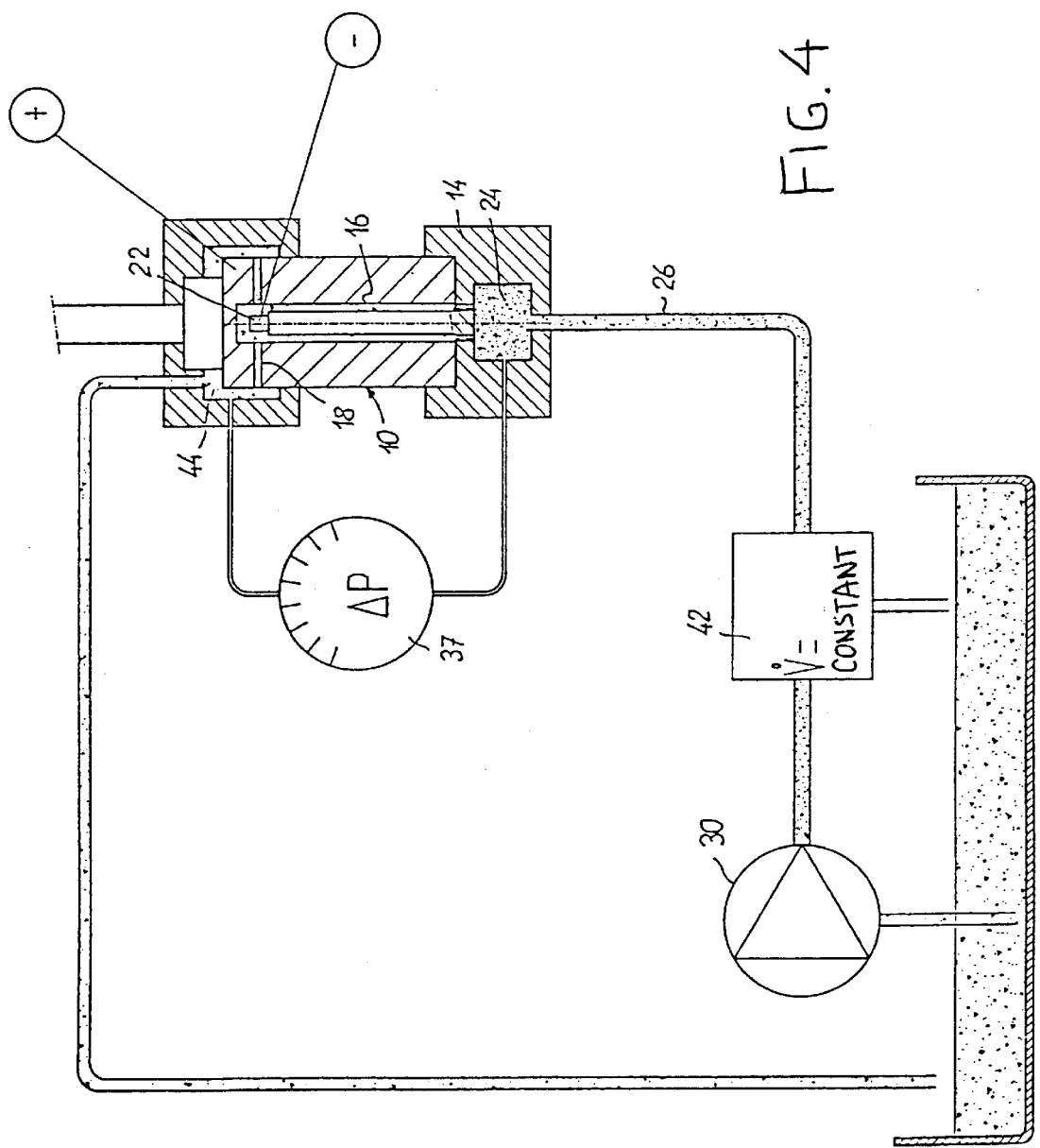
FIG. 4 also a variant of FIG. 1.

The variant according to FIG. 4 is similar to that of the pressure measurement according to FIG. 2. Here also in the first running of the electrolyte a throughflow regulator 42 is used which ensures a constant fluid flow. However, not the absolute pressure of the electrolyte in the tool chamber 24 is measured but the pressure difference between this chamber 24 and a chamber 44 disposed offset from the flow and behind the workpiece 10, into which the electrolyte is conducted from the transverse bores 18 of the workpiece 10. Since with increasing edge rounding at the terminations of these transverse bores 18 the flow resistance decreases, the pressure difference decreases accordingly. This can also be utilized as the regulating variable for the series treatment which, however, presupposes in known methods repeated test runs with a calibration measurement following each time. If through these first runnings the nominal pressure difference is found which corresponds to a specific calibration, the subsequent series treatment is always terminated when the actual pressure difference has reached the nominal pressure difference. In that case all workpieces have the same treatment condition, thus are calibrated identically.

Figure 5:
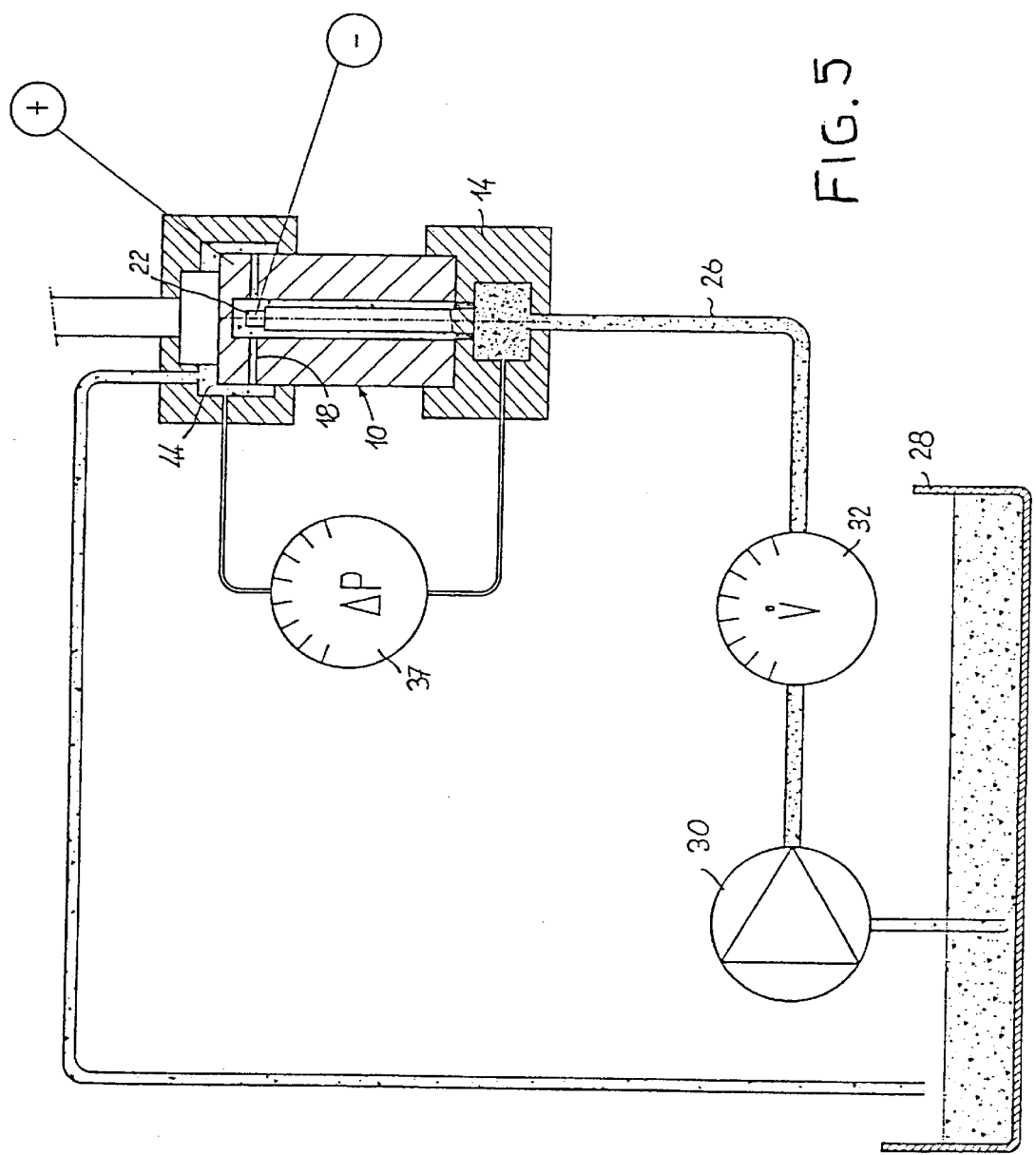
FIG. 5 a last variant of the described installation.

Lastly, FIG. 5 shows a variant which is similar to the last-described variant according to FIG. 4 and differs only thereby that, instead of the throughflow regulator 42, a throughflow measuring device 32 is used and both measured values of measuring devices 32 and 37 are combined via the pump characteristic into a mathematically computed value to which the series treatment is subsequently adjusted.

I claim:

1. A process for electrochemical treatment flow channels in metal workpieces by means of a tool inserted into the channels and an electrolyte flow between the tool and the flow channels, the process comprising:

(a) electrochemically treating a workpiece (10) during a test run;

(b) measuring at least one physical value for the workpiece, the value being selected from the group consisting of volume flow of electrolyte through the channel and electrolyte pressure in the channel;

(c) placing the workpiece into intermediate storage;

(d) calibrating the workpiece with test oil under high pressure for determining an actual throughflow value for the channel;

(e) comparing the actual throughflow with a nominal throughflow value for the channel;

(f) in the event deviation exists between the actual and the nominal throughflow values, repeating steps (a), (b), (d) and (e) until the actual throughflow value agrees with the nominal throughflow value; and (g) storing the electrolyte value determined in a last repeating of the steps, the electrolyte value being a new nominal value used for subsequent treatments of workpieces as a regulating variable for the termination of the treatments;

(h) the pressure of the electrolyte during the electrochemical treatment and during the subsequent treatments being maintained on the order of magnitude of 100 bars.

2. A process as stated in claim 1, wherein, when measuring the volume flow of the electrolyte, its pressure is kept at least approximately constant.

3. A process as stated in claim 1, wherein at least one electrolyte value is measured continuously during the treatment procedure.

4. A process as stated in claim 1, wherein at least during a final phase of the treatment, the measurement of the at least one electrolyte value takes place after an operating current for the treatment has been switched off at least temporarily.

5. A process for the electrochemical treatment of flow channels of metal workpieces by means of a tool extending into them and an electrolyte flow between the tool and the flow channel, wherein at least one physical electrolyte value selected from the group consisting of volume flow of the electrolyte and pressure of the electrolyte, is measured in a reference sample workpiece calibrated previously with test oil under high pressure and the determined electrolyte value is stored as a nominal value and used for a subsequent series of electrochemical treatments of the workpieces as a regulating variable for a termination of the treatment, the pressure of the electrolyte during the electrochemical series treatment of the workpieces being maintained on the order of magnitude of 100 bars.

6. A process as stated in claim 5, wherein, when measuring the volume flow of the electrolyte, its pressure is kept at least approximately constant.

7. A process as stated in claim 5, wherein the at least one electrolyte value is measured continuously during the treatment procedure.

8. A process as stated in claim 5, wherein, at least during a final phase of the treatment, the measurement of the at least one electrolyte value takes place after the operating current of the treatment is switched off at least temporarily.

* * * * *